Patented May 9, 1939

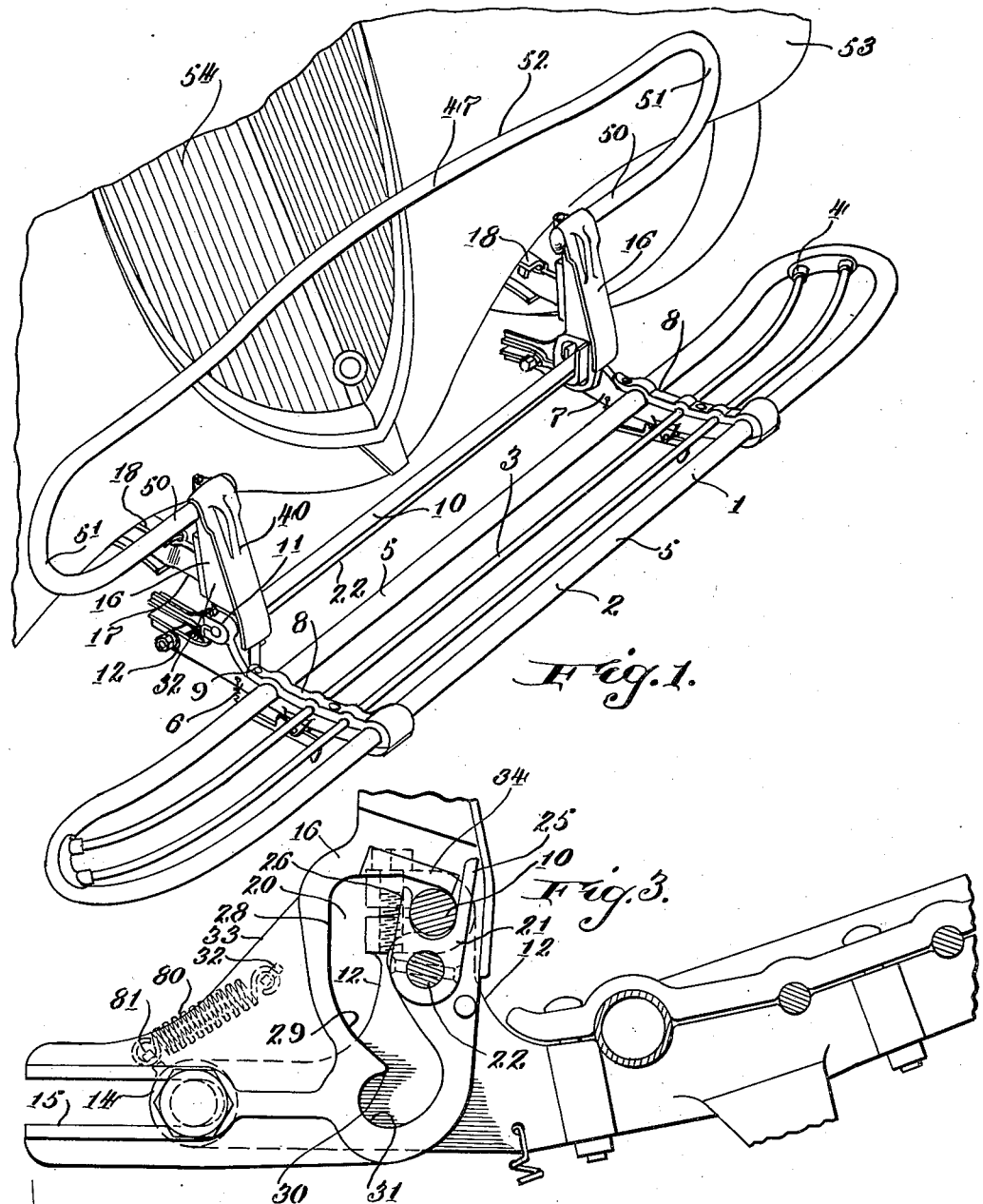

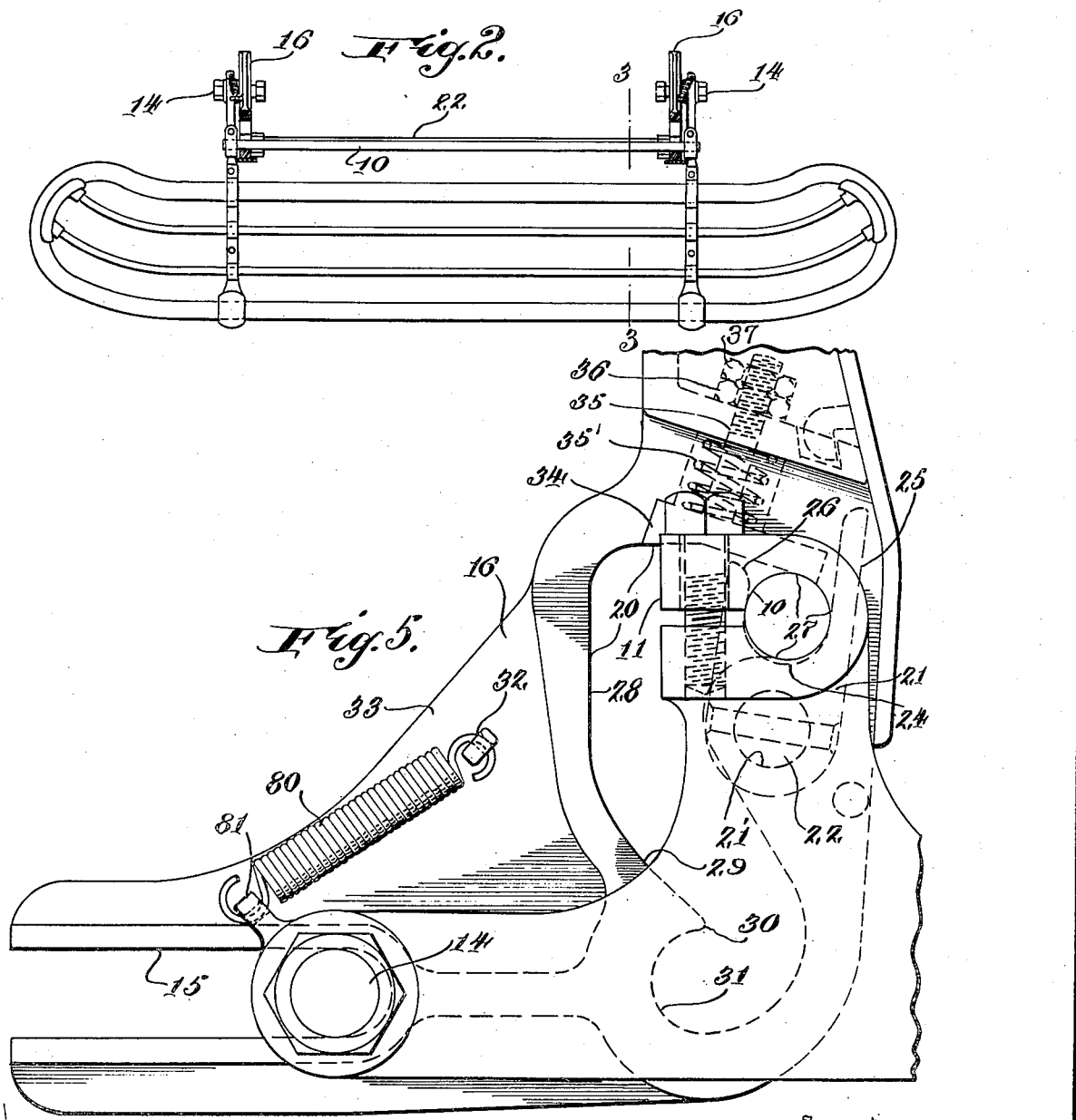

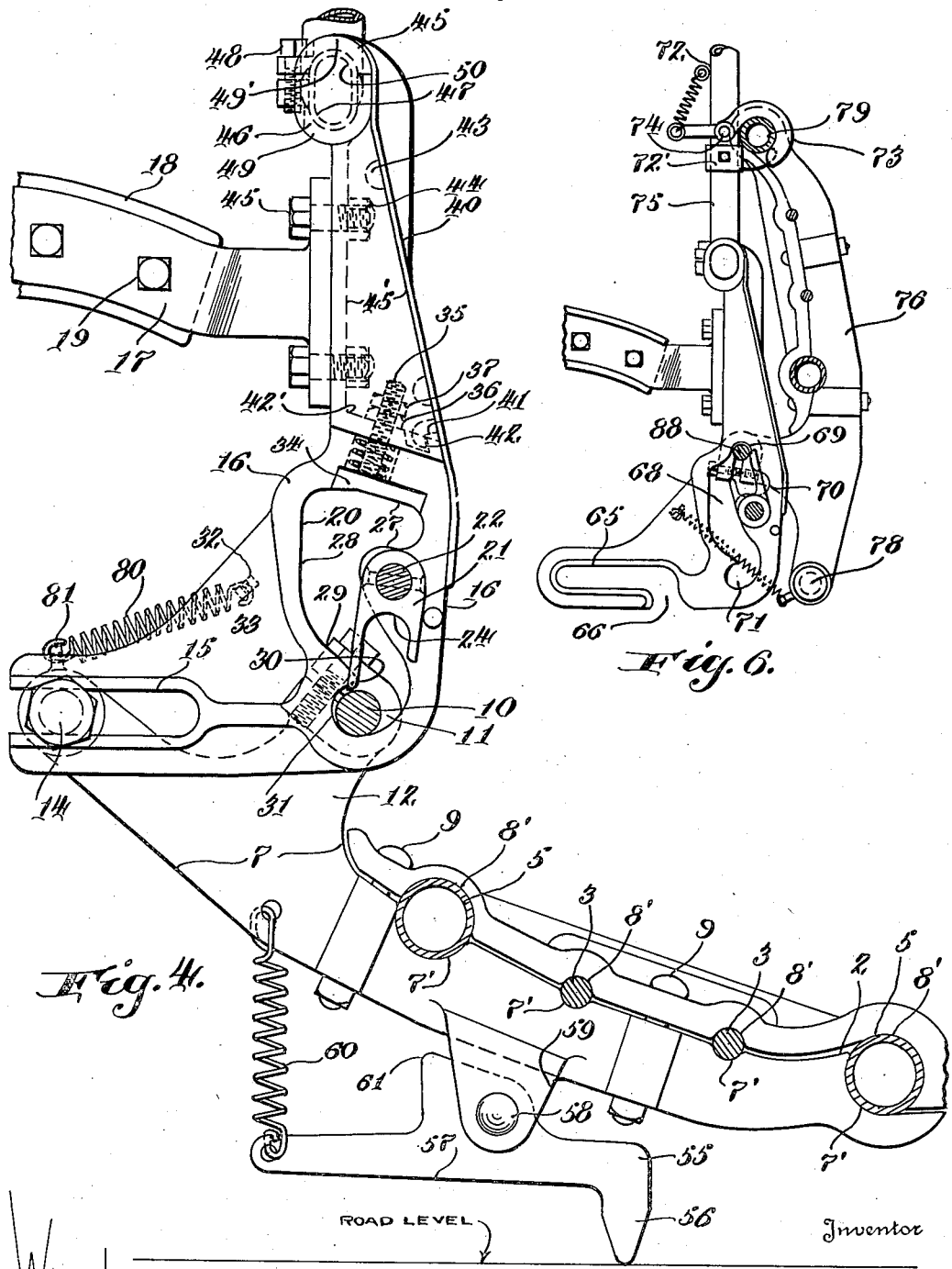

2,157,147

UNITED STATES PATENT OFFICE 2,157,147

MOTOR VEHICLE FENDER

August A. Roth, Baltimore, Md.

Application May 24, 1935, Serial No. 23,227

9 Claims. (Cl. 293—36)

The invention relates to a fender for motor vehicles which in the preferred form also serves in the capacity of a bumper and may include a guard for the protection of the front of the vehicle.

The fender is of the type which is dropped in front of the vehicle into or nearly into contact with the surface of the road to prevent pedestrians or animals which may be struck by the vehicle from being dragged under the vehicle. The majority of such accidents occur at speeds below twenty miles per hour so that dragging and crushing beneath the vehicle are the main source of injury in such accidents.

These facts have been obtained by analysis of the records of traffic accidents and it is at these speeds that the apparatus of the invention operates at the maximum of efficiency.

The invention relates to a fender of the type described, which when it encounters a resistance corresponding to that which would result from striking a pedestrian or animal, the fender having been previously raised to running position at about the height of an ordinary bumper and supported in this position, is released and dropped so that its forward edge is supported on or slightly above the roadbed in such a manner as to catch the victim and prevent him from being dragged under the vehicle. When the necessity for the fender thus incurred has passed, it is merely raised to operative or running position, where it is automatically locked.

It is also of interest that the fender supporting mechanism in the preferred form is so constructed that when a rigid body is encountered, the fender being pushed directly backward with a much stronger and more definite thrust than that resulting from contact with an animal or pedestrian is held in or substantially in the raised or bumper position in which it extends forwardly from the front of the vehicle frame, being deflected upwardly slightly above the horizontal, and in this position it serves most efficiently as a bumper, checking the momentum of the vehicle before the front of the vehicle does, as distinguished from the bumper, contacts the obstacle. Thus, assuming that the vehicle is an automobile, injury to the radiator, fenders, etc., is prevented.

While in the preferred construction the fender is retained in normal running position in which it is inclined upwardly from the horizontal even when the car is in the garage, a secondary form of the invention is included in which provision is made for folding the bumper upwardly and backwardly to a vertical position, effecting an economy of room by shortening the overall length of the vehicle. This feature makes it practicable for the vehicle to be stored in a garage space considerably shorter than is required when the bumper is so constructed that it is held at all times except when depressed for operation in a substantially horizontal or slightly inclined position.

In the preferred construction the invention includes a fender member or bumper in the form of a single continuous elongated loop of steel or similar tubing extending around the entire periphery of the bumper. This bumper which also serves as a fender or basket, as already described, is supported on rigid members secured to the sides of the loop and extending transversely of the short dimension which supports are in turn secured to the front of the chassis, the supports being preferably capable of automatic operation after the manner already suggested. The transverse members serve to lend a relatively rigid quality to the supports.

In the accompanying drawings I have illustrated a fender of back up type embodying the feature of the invention in the preferred form.

In the drawings:

Figure 1 is a perspective view of the front of a motor vehicle equipped with the fender of the invention.

Figure 2 is a top plan view of the same.

Figure 3 is a fragmentary section on the line 3, 3 in Figure 2, looking to the right and showing the bumper member in normal running or bumping position.

Figure 4 is a similar view showing the bumper member in depressed or pickup position after contact with an obstacle, the complete support and bumper member being shown.

Figure 5 is a fragmentary elevation of the support and a fragmentary portion of a thrust arm looking from the left in Figure 2, the bumper being in elevated or running position.

Figure 6 is a section corresponding to Figures 3 and 4 and showing a modified form of the device, the bumper member being folded, i. e., swung upwardly and rearwardly, to vertical position.

Referring to the drawings by numerals, each of which is used to indicate the same or similar parts in the different figures, the construction shown includes a bumper or basket member 1, which in the preferred form comprises an elongated loop of steel or metal having similar properties. This metal is preferably in the form of a continuous tube 2 extending around the entire periphery of the loop. In the form shown the loop construction is supplemented by rods 3 which may, if desired, be hollow or tubular. These rods as shown are two in number spaced with substantial uniformity across the short dimension of the loop, extending longitudinally thereof and secured at their ends at 4 to the inside of the loop at the ends of the latter, the rods being substantially parallel to the long sides 5 of the loop. The fender or bracket member 1 which may be thus constructed or may on the other hand be constructed in any suitable or convenient manner, is in the form shown supported on and also braced transversely by thrust members 6 and 7. The rods and tubes are in the form shown secured to the top of each respective thrust member 6, 7 by heavy straps or bands 8 provided with U shaped pockets 8' to take over the rods and through which they extend, said rods or bands overlying the top surfaces of the thrust members 6 and 7 which have similar pockets 7'. The bands are secured by bolts or rivets 9, 10 with the pockets in registration.

The thrust members 6, 7 are connected together by a follower rod 10 which extends across the vehicle from one thrust member to the other, being secured in suitable split bosses 11 provided for this purpose on each thrust member and formed on the upper end of a short lug 12 which projects upwardly from the thrust member near the rear end. Each thrust member 6, 7 extends rearwardly beyond the lug 12, being provided at its rear end with an inwardly projecting follower 14. This follower in the form of the invention shown, Figures 1 to 5, rides in a horizontal slot 15 in a corresponding carrier bracket 16, one of which is secured to the front of the chassis at each side. In the form of the invention shown each carrier bracket is provided with a carrier arm 17 secured or otherwise applied to the rear face of the bracket 16 and formed to fit in the forwardly projecting channel 18 of the chassis, any desired or obvious variation of this and other details being within the scope of the invention. The arm 17 is secured in and to the channel 18 by means of bolts 19 or in any suitable maner.

The slot 15 as shown in Figures 1 to 5 is open at the rear end and suitably bossed to give the necessary strength. An important feature of the brackets 16 consists of a cam slot 20 in which the follower rod 10 operates, giving in conjunction with the fore and aft motion of the stud 14 in the slot 15 the desired automatic functioning of the fender member 2. The swinging guide 21 also contributes in an important way to the performance of this function by transferring the follower rod 10 backwardly and downwardly from pockets 27 when an obstacle is encountered by the bumper member. These swinging guides, there being one for each bracket 16 and each thrust member 7, are carried on the oscillating guide rod 22 which extends across the front of the machine from one bracket to the other, being mounted at its ends in suitable bearings 21' in the respective brackets 16 slightly above the center of the cam slot 20. Each swinging guide 21 is shown in the form of a two tyned fork having between the tynes a U-shaped seat 24 for the follower rod 10. The normal position of the swinging guide corresponding to the normal or bumping position of the fender member 1 is shown in Figures 3 and 5. In this position the guide extends upward radially from the oscillating guide rod 22 to which it is rigidly secured to move therewith. The forward arm or tyne 25 of the forked guide in this position is longer than the rearmost arm 26, but these details are capable of considerable variation.

The cam slot 20 resembles an S in shape, lying in a fore and aft plane of the vehicle. This slot is provided with a pocket 27, at the top in which in the normal raised position of the fender member 2 the follower rod is located, being at this time also seated in the pocket 24 of the swinging guide 21. The cam slot 20 extends directly back from the pocket 27, having a substantially vertical rear wall 28 opposite and below the pocket 27, from the bottom of which vertical rear wall 28 the rear wall of the slot projects downwardly and forwardly at 29 to a point 30 which overlies the bottom pocket 31 which is to the rear and below the point 30. The pocket 31 forms the lower end of the S. In this pocket the follower rod is located in the depressed or operative position of the bumper member or bracket 2. There is also a helical tension spring 80 connected at one end to a suitable lug 81 on the follower stud 14 and at its other end to a lug 32 on the web 33 of the bracket 16 just to the rear of the cam slot 20. The construction also includes an antirattling device in the form of a spring plate 34 carried by a screw shank 35 which extends through a suitably located web 42' on the bracket. A helical spring 35' encircles the shank 35 between the plate 34 and the web 42' and this shank is taken up by a nut 36, which is secured in adjusted position by a locknut 37 overlying the nut 36. The antirattler plate 34 rests on the follower rod 10 when it is located in the upper forward pocket 27, which corresponds to the normal or running position of the fender member 2.

In operation the bumper member 2 being raised by hand or in any suitable manner, and being guided by spring 80 and followers 10, 14 in slots 20, 15, the follower rod 10 follows the slot 20 upwardly and enters the pocket 27, as best shown in Figure 3, being partially supported and held in the pocket by the swinging guide member 21, the rod being enclosed in the seat 24 in said guide member and located between the forks 25, 26 of said guide member. The rod 10 enters the seat 24 which is then depending as the rod 10 is moved upwardly from seat 31. The forward tension of the spring 80 applied to the stud 31 tends to hold the bumper in the position described with the follower rod 10 in the pocket 27 and in the seat 24. The follower studs 14 move forwardly in slots 15 as the rod 10 moves upwardly and then forwardly and the spring 80 urges the fender forwardly.

When the fender member 2 comes in contact with a stationary rigid body as a definite obstruction in the path of the vehicle which might be a telegraph post, a wall or the like, or with a lighter body as a pedestrian or animal encountered in the road, the thrust of the contact forces the bumper member backwardly, stretching the spring 80. This moves the follower rod 10 directly to the rear out of the seat 27 and into contact with the vertical rear wall 28 of the slot 20. In this operation the seat 24 of the swinging carrier 21 swings rearwardly tending to support the rod to its new position. The two swinging carriers, 21, one at each side, are connected by the rod 22 so that they operate together, have the effect of releasing both sides of the fender simultaneously even though the contact of the fender with the obstacle is at one side only.

If the resistance encountered is excessive due to contact with a rigid body, the fender member 2 is held in elevated position so long as the rearward pressure due to the resistance of the object encountered, lasts, and has the effect of a bumper. On the other hand, if the object encountered is of a yielding nature, the thrust is almost immediately relieved and the rod 10 passes downwardly along the slot 20 to its bottom position in the pocket 31 at the lower end of the slot 20. Under these circumstances the fender member 2 is dropped immediately to the position in which it is shown in Figure 4, which may be termed the operative position in which it engages any movable object which may be encountered, preventing it from being dragged under the vehicle having a tendency on first contact to move the object upwardly so that it may be caught in the fender member 2 which may be characterized as a basket.

In the operation of the fender as thus described, the follower or follower rod 10 is slightly lifted or eased out of the pocket 27 by the swinging guide member 21 which with the rod 22 as seen from the left in Figure 4 swings counterclockwise when the fender member encounters an object. This permits or causes the follower rod 10 to move backwardly out of the pocket or seat 27 and downwardly into the bottom pocket 31, causing the fender member 2 to move from its upper advanced running position, swinging downwardly to depressed or pick up position as follower rod 10 moves downwardly to the bottom rearmost pocket 31 or seat which corresponds to the depressed position of the bumper, the follower 14 having a corresponding motion in slot 15. In this position the basket or fender member 2 picks up any movable object in its path. When the fender operation is completed, the fender member 2 may be lifted by hand and easily returned to the original position in which it is supported during running until further obstructions are encountered, follower rod 10 being returned to pockets 27 and carrier seats 24. In the bumping operation when an excess resistance is encountered the fender drops as soon as the pressure is relieved. When a less resistance as that incident to striking a person is encountered, the fender drops immediately.

The preferred construction, Figures 1 to 5, includes in addition to the construction already described a cover plate 40 for the front of each bracket 16. These cover plates are provided each with a downwardly disposed hook 41 near the bottom. The hook engages a slot 42 in the web 42', and positioning lugs 43 at each side spaced apart in the direction of the length of the cover plate, bearing against the sides of a pocket 45' formed in the front of the bracket in which are located the nuts 44 of the bolts 45 by which the supporting arm 17 is secured to the back of the bracket. The plate 40 extends upwardly around the top of the bracket being formed at its upper end into the upper half 49' of a split collar 46, the lower half of which 49 is formed on the upper end of the bracket. This collar carries the guard 47 to be further described. The upper and lower halves of the split collar 46 are drawn together by means of a bolt 48 engaging suitable lugs at the back whereby the two halves 49', 49 of the split collar are secured together and tightened to clamp the guard 47. This guard 47 is in the form of a bow or open loop, of steel or other metal having similar properties, the ends 50 of the loop or bow which are shown as oval being disposed inwardly and secured in and by the split collars 46 at the top of the brackets, as already described. The loop or bow 47 extends outwardly at both sides from the clamped ends 50 in a substantially horizontal direction and curves upwardly at the ends of the loop at 51, the closed top side of the loop at 52 extending from the upper side of the curved ends across the front of the vehicle. In the form shown the loop or bow 47 extends across the front of the radiator 54 to which it affords protection, also serving as a protection to the front ends of the sheet metal fenders indicated at 53.

It is also of interest that the fender member 2, see particularly Figure 4, may in accordance with the preferred form of the invention be provided with a marker 55 for recording the distance through which the vehicle moves from the time the fender is depressed until the vehicle is stopped. This marker consists of a pointed tooth 56 extending downwardly from arm 57 which is pivoted intermediately at 58 on depending lugs 59 which extend downwardly from the bottom of the bracket. This marker lever 57 is controlled by tension spring 60 which is connected at one end to the rear end of the arm 57 and extends upwardly to the corresponding thrust member 6 or 7, to which it is attached near the bracket 16. The spring has a tendency to swing the marker in right handed rotation about the pivot 58, permitting it to yield in the opposite direction and the marker is located in normal position, i. e., when the fender member is raised by means of a stop lug 61 formed on the upper side of the arm 57 and extending rearwardly from the pivot 58. This stop lug 61 is held normally in contact with the bottom of the thrust member 6 or 7 by the tension of the spring. The tooth 56 is at the front end of arm 57.

When the fender member is depressed, the tooth 56 engages the road yielding slightly upwardly against the tension of the spring 60 and causing the arm 57 to rotate to a corresponding degree in a counterclockwise direction. In this way the marker tooth 56 is applied to the road surface with a predetermined pressure sufficient to make a mark which gives the necessary record as to the motion of the vehicle after encountering an obstacle and up to the time that the vehicle is stopped. In this way the driver of the vehicle is, in case of accident, enabled to ascertain and prove the exact distance travelled by the vehicle after encountering the obstacle which, as already pointed out, may be another vehicle, a pedestrian or even an animal. If there is a charge of reckless driving and a claim that the victim was dragged a considerable distance showing that the driver was unable to stop his vehicle in a reasonable time, i. e., that the vehicle was not under control, the facts as to the distance required to stop can be proved by means of the mark made in this way.

In Figure 6 I have illustrated a slightly modified form of fender of the same general type as that just described, but different therefrom in that it is adapted to be folded upwardly to vertical position at the front of the machine, in which position it is stowed to reduce the overall length of the machine when it is in the garage or under similar circumstances where the fender is unnecessary and the space occupied is an important element. To this end the slot 65 which corresponds to the slot 15 in the bracket 16 is opened downwardly at the forward end at 66 and the cam slot 68 which corresponds to the cam slot 20, Figure 4, is provided with an upwardly extending pocket 69 which opens downwardly into the slot 68 near the top center, the slot 68 also being provided with a pocket 70 corresponding to the pocket 27 in Figure 4 and a bottom pocket 71 corresponding to the bottom pocket 31 in Figure 4. The construction is otherwise similar to that already described, except that the bow or loop 72 which corresponds to the bow or loop 47 in Figure 1 is provided at each side with a spring hook 73, the concave side of which is downwardly disposed, this hook being mounted on the rod 75 of which the guard loop 72 is formed, it being understood that both the guard loops 47 and 72 are preferably formed of a steel or similar rod which may be hollow or solid, being preferably a tube, the cross section being elongated when desired.

The operation of the fender member or bracket 76, Figure 6, is similar to that of the fender member 47, previously described, except that, when it is desired to throw the bumper upwardly, it is drawn forwardly, and the front is given an upward thrust which causes the stud 78 which corresponds to the follower stud 14 to pass downwardly out of the slot 65 through the opening 66. The fender member 76 is then lifted and suspended from the spring hooks 72' which engage the front transverse rod 79 or the front side of the loop of which the fender member is formed, as shown in Figure 1, and the spring hook member 73 is then allowed to engage the transverse rod 79 as shown. At this time the follower rod 80 enters the pocket 69 at the top, holding the bottom part of the fender member in position and preventing rattling.

I have thus described specifically and in detail a pick up and bumper fender embodying the features of my invention in the preferred form, the description being specific and in detail in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. In a motor vehicle fender, a fender member adapted to serve as a pickup device and bumper, thrust means secured to said fender member, carrier means on the front of the vehicle having a cam slot with a substantially vertical rear guiding surface near the top, a follower member on said thrust means engaging the cam slot which has a forwardly extending follower seat at the top and the carrier means also having a rearwardly extending slot and the thrust means having a second follower sliding in said slot, and spring means tending to advance the latter follower which is located at the rear of the thrust means.

2. A motor vehicle fender having a basket mounted to swing from an upper running position to a depressed pick up position thrust means at each side and a trippable swinging carrier for each thrust means for supporting the basket in upper position from which it is released by contact with an obstacle in the path of the vehicle as it advances said carriers having supporting surfaces for said thrust means upwardly disposed and a pivot below said surfaces, the carriers being mounted to swing backwardly and downwardly from said upper position in response to such contact, and means comprising substantially vertical stop surfaces opposite said carriers in said upper position for taking up supporting and resisting horizontal thrust from said thrust members, tending to hold the fender in raised bumping position when an excess resistance is encountered and to release the fender permitting it to drop at the instant the resistance is reduced to a predetermined normal.

3. In a motor vehicle fender, a fender member adapted to serve as a pickup device and bumper, thrust arms spaced apart laterally, connected together and secured to said fender member, carrier means on the front of the vehicle at each side having upright cam slots, follower members on each thrust arm, a cross rod rigidly connecting the follower members on the two sides, said follower members engaging the cam slots which have a follower seat at the top, the carrier means also having a rearwardly extending slot and the thrust arms each having a second follower moving in said slot, and spring means tending to advance the thrust arms, the followers being spaced apart on said arms by a distance corresponding to the distance between the upper end of the cam slot and the forward end of the rearwardly extending slot, and swinging guides with a seat adapted to support the first mentioned followers in the top of the cam slot and to shift the said cam followers backwardly, and to guide them to move together as they move backwardly and downwardly, and upright members at the rear of said carriers to support the said followers from the rear to prevent dropping of the fender when the fender member encounters excess resistance by which it is thrust rearwardly as the vehicle advances.

4. In a motor vehicle fender, a fender member adapted to serve as a pickup device and bumper and including thrust means connected to the vehicle, said connection including a carrier having a guide with a substantially vertical follower engaging surface permitting the follower to move freely in a substantially vertical direction, follower means engaging the guide which has a follower seat at the top and a follower seat at the bottom, which seats are oppositely disposed the carrier also having a rearwardly extending slot and the fender member having a follower means sliding in said slot, and spring means tending to advance the latter follower, the follower means being spaced apart by a distance corresponding to the distance between the upper end of the cam slot and rearwardly extending slot.

5. In a motor vehicle fender, a fender member adapted to serve as a pickup device and bumper and including thrust means rigid therewith, carrier means on the front of the vehicle at each side having upright cam slots, follower members on the thrust means engaging the cam slots which have a rearwardly open follower seat at the top and a forwardly open follower seat at the bottom, the carrier means also having rearwardly extending slots and the fender member having a second set of followers sliding in said slots, a spring tending to advance the followers which are spaced apart on said fender member by a distance corresponding to the distance between the upper end of the cam slot and the rearwardly extending slot, the upper seat being located forwardly of the main portion of the slot and the rear surface of the slot opposite and below said seat being substantially vertical to support the thrust of the first mentioned follower means when the bumper encounters an excessive resistance.

6. In a motor vehicle fender a fender member consisting of a substantially oval loop of continuous tubular construction elongated transversely of the vehicle and formed in a single piece and thrust members extending longitudinally of the vehicle and spaced apart laterally and having supporting means on the front of the vehicle, the thrust members extending across the loop and spaced from each end of the loop and having means whereby they are secured to each side of the loop the thrust members having concave seats on their upper sides to receive the sides of the loop and cap bars spanning the loop, and having downwardly disposed concave seats to engage the sides of the loop from above, the cap bars overlying the thrust members and the portions of the loop seated therein and being secured to the thrust members.

7. In a motor vehicle fender, a fender member consisting of an elongated continuous loop of tubular material formed in a single piece and rounded at the ends which are at the sides of the vehicle and thrust members spaced apart laterally and having supporting means on the front of the vehicle, the thrust members extending across the loop and having means whereby they are secured to each side of the loop, and longitudinal tubular members inside the loop spaced apart extending from one end to the other of the loop and secured at their ends to the ends of the loop and means securing said tubular members to said thrust members said securing means comprising cap bars overlying the thrust members and the portions of the loop engaged thereby and secured to said thrust members which engage the loop from beneath.

8. In a motor vehicle fender, a fender member, thrust arms spaced apart laterally and supporting said fender member on the front of the vehicle, said thrust arms having each a cam slot follower, and a rear slot follower, the latter at their rear ends, supporting brackets having a cam slot and a rearwardly extending slot, the cam slot having seating means at the top and the rearwardly extending slot having a downwardly disposed opening through which the follower in said cam slot may be released, permitting the fender member to be folded against the front of the vehicle, means for holding the fender member in upright position and a spring tending to advance the follower in said rearwardly extending slot and in folded position to hold the fender member against rattling.

9. The combination with a pick up fender for a vehicle, the fender having a pick up position and a normal raised position, of brackets on the front of the vehicle and means on said brackets for operating said fender and removable covers on the front of said brackets for concealing said operating means and spring locking means for said covers.

AUGUST A. ROTH.